May 21, 1968 G. N. JORGENSEN ET AL 3,384,855
PLUG-IN BUS DUCT HAVING CORRUGATED SIDEWALLS
Filed April 15, 1966 5 Sheets-Sheet 4
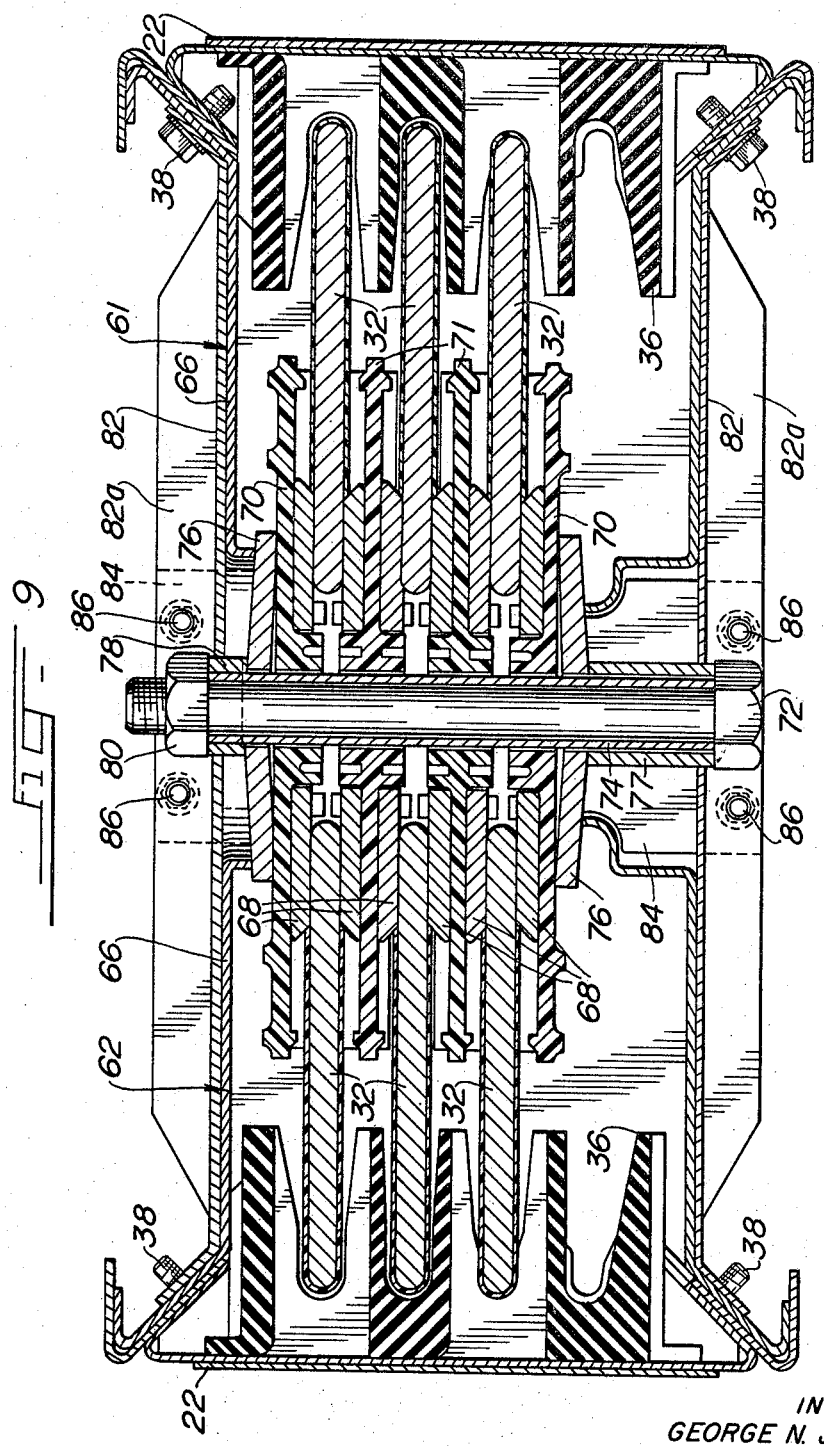
INVENTORS
GEORGE N. JORGENSEN
HARRIS I. STANBACK
BY
Paul J. Rose
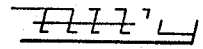

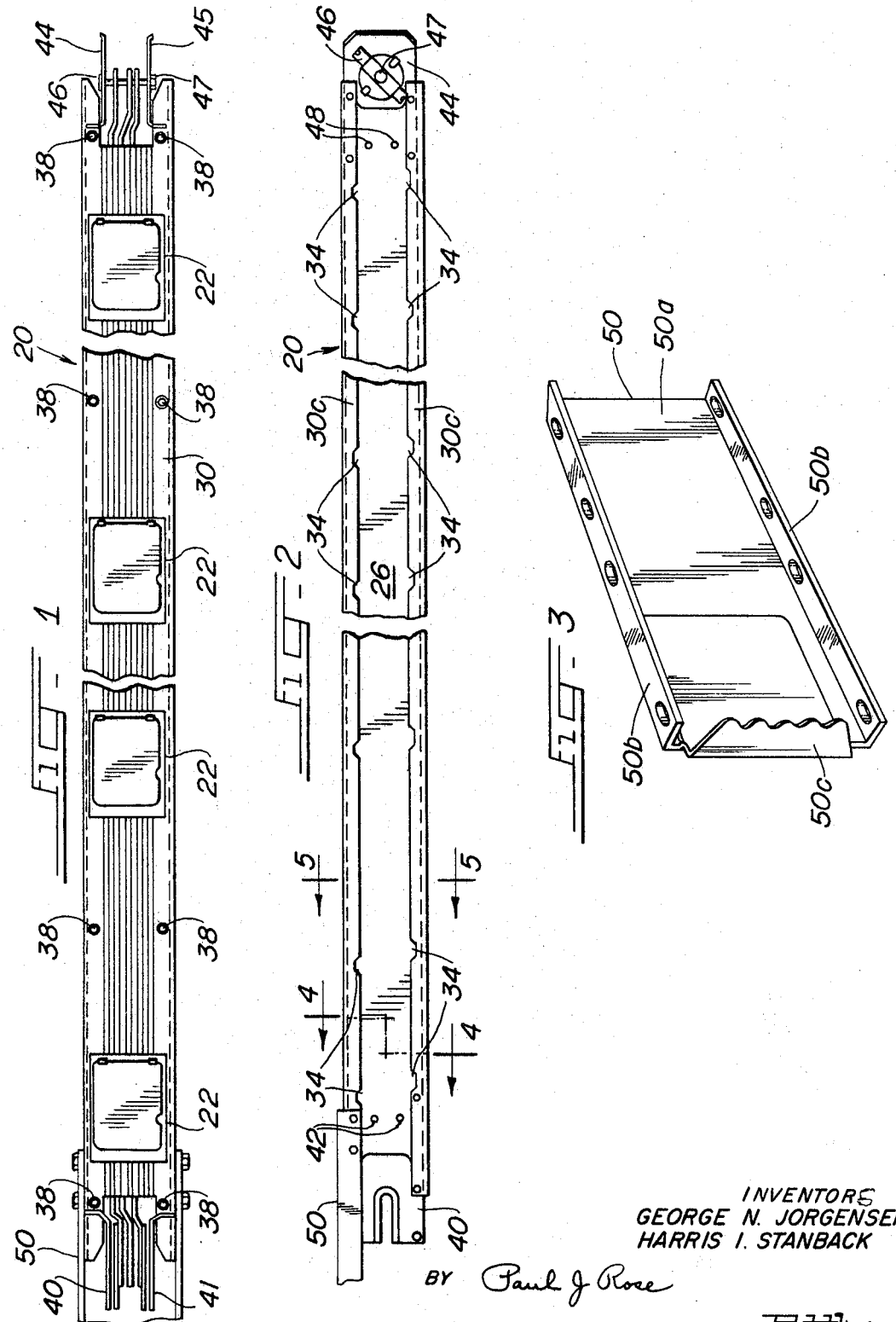

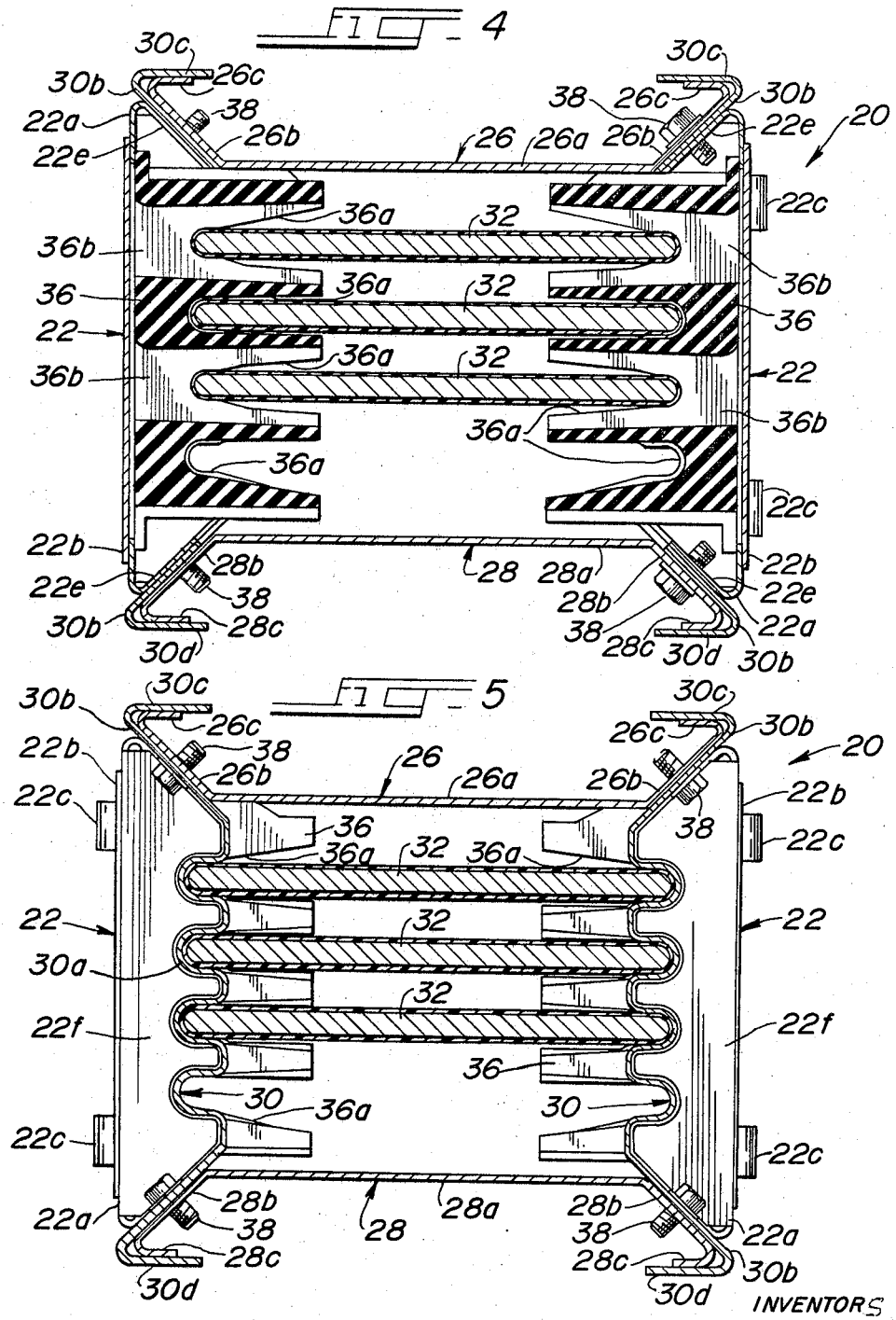

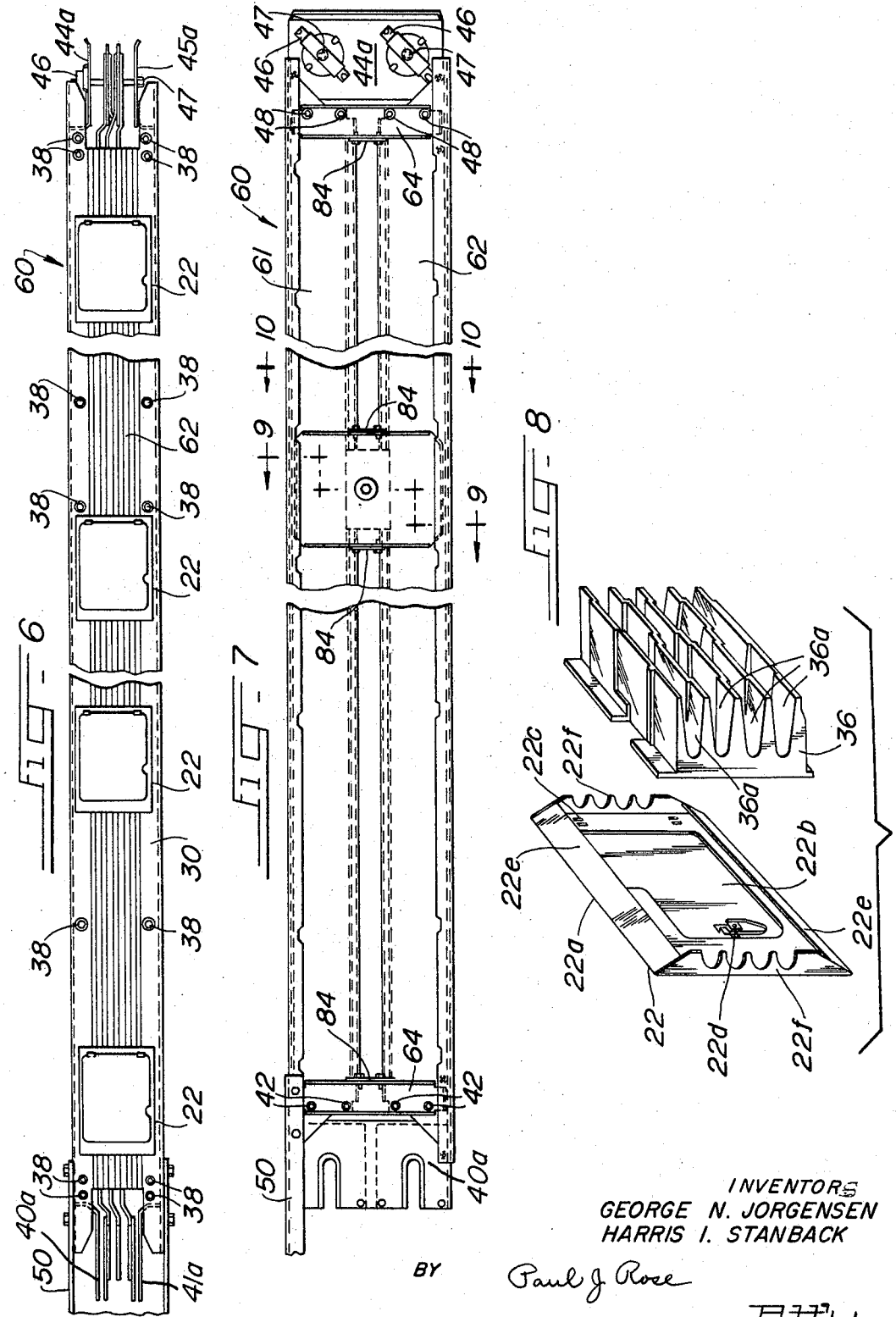

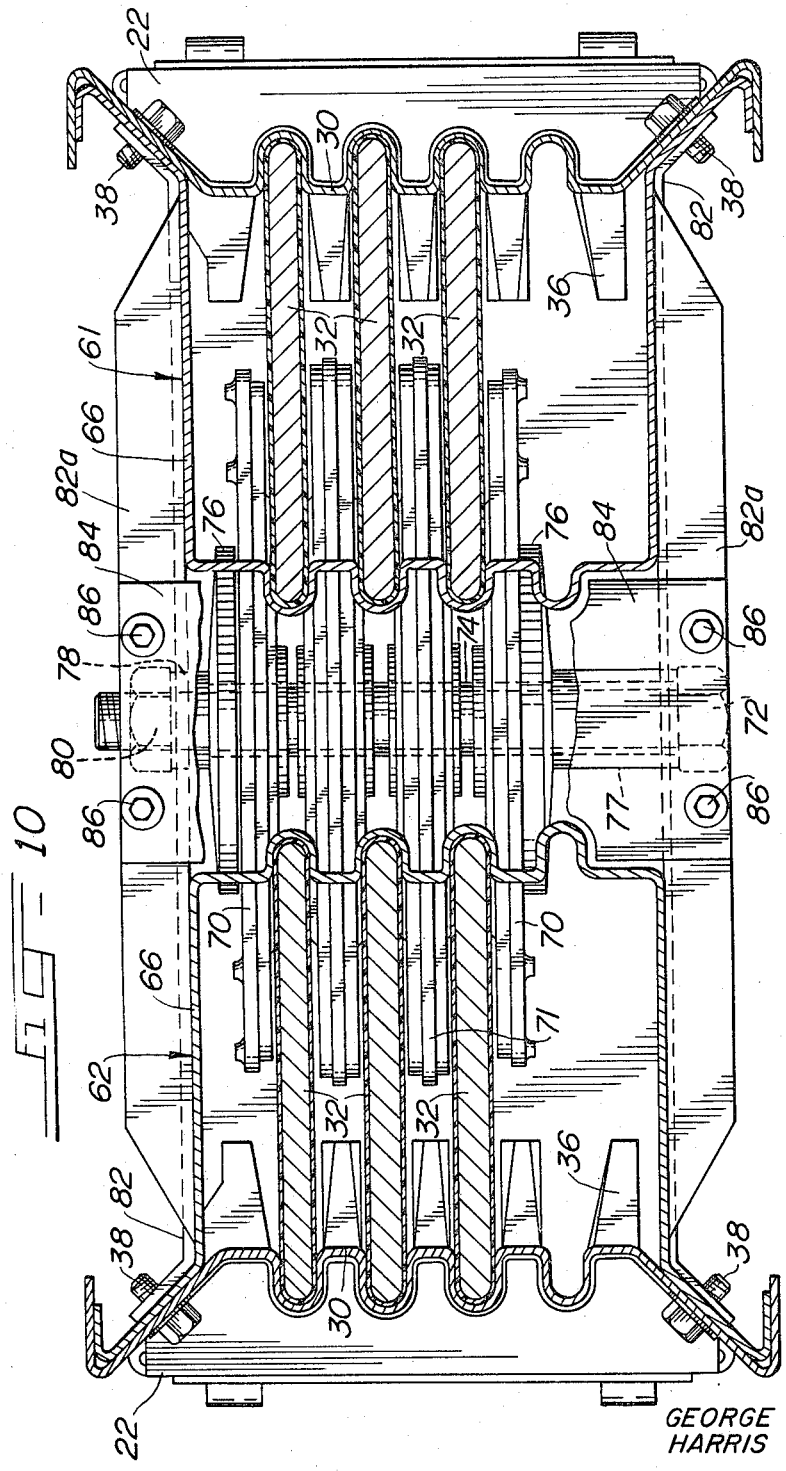

United States Patent Office 3,384,855
Patented May 21, 1968

3,384,855
PLUG-IN BUS DUCT HAVING CORRUGATED
SIDEWALLS
George N. Jorgensen and Harris I. Stanback, Lexington,
Ky., assignors to Square D Company, Park Ridge, Ill.,
a corporation of Michigan
Filed Apr. 15, 1966, Ser. No. 542,826
8 Claims. (Cl. 339—22)

ABSTRACT OF THE DISCLOSURE

A four-piece housing of rectangular cross-section containing flatwise stacked bus bars has reoccurring side openings which facilitate parallel connection of two ducts by providing adjacent openings through which splice plates of a joint structure extend to effect edgewise electrical interconnection of corresponding bus bars. Each duct housing has corrugated side wall portions structurally engaging the opposite edges of the bus bars. For use as a single duct, 45° flange portions extending from the edge portions of the four housing walls are held together by four rows of bolts.

This invention relates generally to plug-in duct, and more particularly to plug-in bus duct the housing of which includes a pair of opposed corrugated sidewalls in which opposite edge portions of flat bus bars are respectively held.

An object of the invention is to provide an improved plug-in bus duct of the type having corrugated sidewalls for holding the bus bars.

Another object is to provide a novel method of reinforcing the housing of such plug-in bus duct.

A further object is to provide a novel method of captivating the protective insulators at the plug-in openings of such plug-in bus duct.

Still another object is to provide double sections of such plug-in bus duct, the separate sections being electrically connected to each other between their respective ends so that similar joint structure may be used at the ends of single and double duct.

Other objects and advantages will appear when the following specification is considered along with the accompanying drawings, in which:

FIG. 1 is a side elevational view of a section of plug-in bus duct constructed in accordance with the invention, portions thereof being broken away;

FIG. 2 is a top plan view of the bus duct of FIG. 1, portions thereof being broken away;

FIG. 3 is a perspective view of a joint cover for the bus duct of FIGS. 1 and 6;

FIG. 4 is a sectional view taken along the line 4—4 of FIG. 2;

FIG. 5 is a sectional view taken along the line 5—5 of FIG. 2;

FIG. 6 is a side elevational view of a double section of plug-in bus duct constructed in accordance with the invention, portions thereof being broken away;

FIG. 7 is a top plan view of the bus duct of FIG. 6, portions thereof being broken away;

FIG. 8 is an exploded perspective view of a hood and door assembly and a protective insulator for the plug-in openings of the bus duct of FIGS. 1 and 6;

FIG. 9 is a sectional view taken along the line 9—9 of FIG. 7; and

FIG. 10 is a sectional view taken along the line 10—10 of FIG. 7.

FIGS. 1 and 2 show a section of plug-in bus duct 20 constructed in accordance with the invention and having a plurality of hood and door assemblies 22 (FIG. 1) secured thereto at intervals on opposite sides thereof over plug-in openings adapted to receive the plug-in terminal jaws of bus duct plugs (not shown).

As best shown in FIG. 5, the housing of the bus duct 20 is formed of four pieces including a top wall portion 26 and a bottom wall portion 28, which may be substantially identical, and a pair of substantially identical sidewall portions 30. The sidewall portions 30 are corrugated and respectively grip opposite edge portions of a plurality of bus bars 32, three of which are shown in the embodiment disclosed and provision being made for incorporating a fourth if desired.

The top wall portion 26 includes a main portion 26a extending horizontally in the normal position of use of the bus duct 20, a pair of flange portions 26b respectively extending substantially at forty-five degree angles from opposite edge portions of the main portion 26a, and a pair of edge portions 26c respectively extending toward each other from the flange portions 26b substantially parallel to the main portion 26a. The bottom wall portion 28 includes a main portion 28a, a pair of flange portions 28b, and a pair of edge portions 28c corresponding respectively to the main portion 26a, flange portions 26b, and edge portions 26c of the top wall portion 26, the flange portions 26b extending upwardly from the main portion 26a and the flange portions 28b extending downwardly from the main portion 28a as viewed in FIGS. 4 and 5.

Each side wall portion 30 includes a corrugated main portion 30a which supports the bus bars 32, a pair of flange portions 30b respectively extending parallel to and engaging respective ones of the flange portions 26b and 28b, and a pair of edge portions 30c and 30d respectively extending parallel to and engaging respective ones of the edge portions 26c and 28c. Each of the edge portions 30c is provided with a plurality of pairs of notches 34 (FIG. 2) respectively adapted to receive pairs of hanging hooks (not shown) of bus duct plugs, and each of the hood and door assemblies 22 secured on a side wall portion 30 is disposed substantially between the notches 34 of a respective pair. As can be noted in FIG. 4, the corrugated main portions 30a of the sidewall portions 30 are cut away to form the plug-in openings covered by the hood and door assemblies 22, the openings in the sidewall portions 30 being respectively adapted to receive protective molded insulators 36, one of which is best shown in FIG. 8.

Each insulator 36 is provided with a plurality of inner recesses 36a in which the bus bars 32 may be received and with a plurality of apertures 36b communicating respectively with the recesses 36a and adapted to receive plug-in terminal jaws of bus duct plugs (not shown).

One of the hood and door assemblies 22 is best shown in FIG. 8. Each hood and door assembly 22 includes a hood member 22a having a plug-in opening normally closed by a door 22b hinged to the hood member 22a by a pair of hinges 22c and carrying a latch member 22d identical to that disclosed in copending application, Ser. No. 519,095, filed Jan. 6, 1966, and assigned to the assignee of this application. Each hood member 22a includes a pair of upper and lower anchoring flange portions 22e and a pair of scalloped side flange portions 22f, the anchoring flange portions 22e extending generally parallel to respective flange portions 30b of a side wall portion 30 when installed thereon, as shown in FIG. 4, and the scalloped side flange portions 22f having edges shaped so as to conform with the corrugated main portion 30a and the flange portions 30b of a side wall portion 30, as shown in FIG. 5.

The sidewall portions 30 are secured to the respective flange portions 26b and 28b by a plurality of screws 38, some of which are spaced from the hood and door assemblies 22 longitudinally of the bus duct 20 and threaded into the respective flange portions 26b and 28b to clamp the respective flange portions 30b thereagainst by the heads of the screws as shown in FIG. 5, and others of which are between the respective pairs of scalloped side flange portions 22f of the respective hood members 22a and are threaded into the respective anchoring flange portions 22e of the hood members 22a to clamp the respective flange portions 26b, 28b, and 30b thereagainst, as shown at the righthand portion of FIG. 4. The insulators 36 are held in position by the respective hood members 22a.

A pair of slotted upper and lower innner joint covers 40 and 41 are secured respectively to the top wall portion 26 and the bottom wall portion 28 adjacent the left-hand end of the bus duct 20 as viewed in FIGS. 1 and 2 by pairs of screws such as screws 42 shown in FIG. 2. A pair of upper and lower outer joint covers 44 and 45 carrying a captive nut 46 and bolt 47 are secured respectively to the top wall portion 26 and the bottom wall portion 28 adjacent the right-hand end of the bus duct 20 as viewed in FIGS. 1 and 2 by pairs of screws such as screws 48 shown in FIG. 2. The opposite ends of the three bus bars 32 are shaped to provide a joint structure substantially identical to that disclosed in U.S. Patent No. 3,189,680. When four bus bars 32 are used, the opposite ends thereof are shaped to provide a joint structure substantially identical to the four-bar joint structure disclosed in U.S. Patent No. 3,187,086.

A side joint cover 50 is best shown in FIG. 3 and includes a main body portion 50a, a pair of upper and lower flange portions 50b, and a scalloped end flange 50c having an edge shaped so as to conform with the corrugated main portion 30a and the flange portions 30b of a side wall portion 30. If desired, two such end flanges 50c may be provided respectively adjacent opposite ends of the main body portion 50a. One side joint cover 50 is shown secured to the left-hand end portion of the bus duct 20 in FIGS. 1 and 2, the flange portions 50b fitting over the flange portions 30c. The scalloped edges on the flanges 50c of the side joint covers 50 and on the side flange portions 22f of the hood members 22a reinforce the corrugated main portions 30a of the side wall portions 30 to provide additional restraining force on the bus bars 32 in the event of flow of excessive current through the bus bars 32 such as might be caused by a short circuit. The side joint covers 50 also act as tie channels in securing two sections of bus duct 20 together longitudinally.

FIGS. 6 and 7 show a double section of plug-in bus duct 60, the side view of FIG. 6 being essentially the same as FIG. 1. The bus duct 60 includes a pair of bus duct sections 61 and 62 (FIG. 7) electrically connected together between their ends by a joint structure shown best in FIG. 9 and mechanically connected together adjacent their ends on their tops and bottoms by pairs of cross tie channels such as top cross tie channels 64 of FIG. 7, the bottom cross tie channels not being shown. Screws 42 which secure the left-hand (FIG. 7) top and bottom cross tie channels 64 to the bus duct sections 61 and 62 also secure in position a pair of double upper and lower inner joint covers 40a and 41a, similar to the single inner joint covers 40 and 41 of FIGS. 1 and 2 but over twice as wide so as to accommodate the two bus duct sections 61 and 62, and screws 48 which secure the right-hand top and bottom cross tie channels 64 to the bus duct sections 61 and 62 also secure in position a pair of double upper and lower outer joint covers 44a and 45a, similar to the single outer joint covers 44 and 45 of FIGS. 1 and 2 but over twice as wide so as to accommodate the two bus duct sections 61 and 62.

The housings of the bus duct sections 61 and 62 are respectively formed in two pieces, as best shown in cross section in FIG. 10, each including an outer side wall portion 30 identical to one of the side wall portions 30 of the bus duct 20, and a generally channel shaped second housing member 66 which takes the place of the top wall portion 26, bottom wall portion 28, and the other of the sidewall portions 30 of the bus duct 20. The bus duct sections 61 and 62 are provided with hood and door assemblies 22, bus bars 32, and insulators 36 identical to those of the bus duct 20.

The joint structure of FIG. 9 is preferably disposed midway between opposite ends of the bus duct sections 61 and 62 and is substantially identical to the joint structure disclosed in the aforesaid pending application, Ser. No. 519,095, although it connects the bus duct sections 61 and 62 transversely, rather than connecting two bus duct sections longitudinally, as in the aforesaid pending application. The portions of the housing members 66 forming the adjacent inner sidewalls of the bus duct sections 61 and 62 are cut away at the transverse joint structure to accommodate a plurality of splice plates 68 and insulating plates 70 and 71 identical to those disclosed in the aforesaid pending application, each bus bar 32 of the bus duct section 61 having a pair of the splice plates 68 disposed on opposite sides thereof and connecting it to a corresponding bus bar 32 of the bus duct section 62. The splice plates 68 are apertured to receive central boss portions of the respective insulating plates 70 and 71, as shown in FIG. 9, and the insulating plates 70 and 71 are apertured at their central boss portions to receive a bolt 72 having an insulating sleeve 74, a pair of spring washers 76, a pair of spacers 77 and 78, and a nut 80 disposed thereon.

A pair of flanged covers 82 for the central transverse joint structure are secured respectively to the top and bottom of the bus duct sections 61 and 62 by some of the screws 38 which hold the housing portions 30 and 66 together and secure a pair of the hood and door assemblies 22 in position respectively on the bus duct sections 61 and 62 on opposite sides of the central transverse joint structure. Between the bus duct sections 61 and 62, the central tranverse joint structure is sealed by a pair of closing plates 84 respectively disposed on opposite sides of the bolt 72 longitudinally of the bus duct sections 61 and 62, each closing plate 84 being secured adjacent one end to a flange 82a of one of the covers 82 by a pair of screws 86 and adjacent the other end to a flange 82a of the other cover 82 by another pair of screws 86. The vertical edges of the closing plates 84 are scalloped to conform with the corrugated inner side wall portions of the housing members 66.

Two additional closing plates 84 are secured respectively to the cross tie channels 64 adjacent opposite ends of the bus duct sections 61 and 62, as shown in FIG. 7.

We claim:

1. A plug-in bus duct comprising an elongated four-piece housing of rectangular cross-section including a top wall portion, a bottom wall portion, and a pair of sidewall portions, said top wall portion having a generally flat main portion extending horizontally in the normal position of use of the bus duct and a pair of flange portions respectively extending upwardly and outwardly substantially at forty-five degree angles with respect to the horizontal from opposite edge portions of said main portion of said top wall portion, said bottom wall portion having a generally flat main portion extending horizontally in the normal position of use of the bus duct and a pair of flange portions respectively extending downwardly and outwardly substantially at forty-five degree angles with respect to the horizontal from opposite edge portions of said main portion of said bottom wall portion, and each of said sidewall portions having a corrugated main portion and top and bottom flange portions respectively extending outwardly at 45° angles with respect to the vertical and parallel to and secured to the respective flange portions of said top and bottom wall portions, and a plurality of elongated generally flat bus bars disposed in said housing in spaced flatwise parallel relationship to each other, each of said bus bars having a pair of opposite edge portions respectively held by said sidewall portions in respective opposed pairs of corrugations thereof.

2. A bus duct as claimed in claim 1, wherein each of said sidewall portions includes a pair of edge portions respectively extending from said flange portions thereof toward the other sidewall portion generally parallel to said main portions of said top and bottom portions.

3. A bus duct as claimed in claim 2, wherein each of said top and bottom wall portions includes a pair of edge portions respectively extending from said flange portions thereof toward each other generally parallel to and disposed on the inner sides of respective ones of said edge portions of said sidewall portions.

4. A bus duct as claimed in claim 1, wherein each of said sidewall portions is provided with a plurality of plug-in openings spaced longitudinally of the bus duct, and said bus duct includes a plurality of protective insulators disposed respectively in said plug-in openings on opposite sides of the bus duct and a plurality of hood and door assemblies secured to said sidewall portions on opposite sides of the bus duct respectively over said plug-in openings, each of said insulators having a plurality of apertures extending therethrough and respectively aligned with said bus bars, and each of said hood and door assemblies including a hood member which holds its respective insulator in position.

5. A bus duct as claimed in claim 4, wherein each of said hood members is provided with a pair of scalloped side flange portions respectively having edges shaped so as to conform with the corrugations of the respective sidewall portion to which the hood member is secured.

6. A double plug-in bus dust comprising a pair of elongated bus duct sections disposed in parallel relationship to each other, each of said bus duct sections including an elongated housing and a plurality of elongated generally flat bus bars disposed in said housing in spaced flatwise parallel relationship to each other, means adjacent opposite ends of said bus duct sections securing the housings thereof in spaced relationship to each other with each bus bar of one bus duct section being disposed in edgewise parallel relationship to a corresponding bus bar of the other bus duct section, and a joint structure disposed between opposite ends of said bus duct sections, said joint structure including a plurality of pairs of splice plates, each splice plate of each pair being disposed on opposite sides, respectively, of a bus bar of said one bus duct section and extending perpendicularly thereto to be disposed on opposite sides, respectively, of a corresponding bus bar of said other bus duct section, and the plurality of said pairs of splice plates respectively electrically connecting the bus bars of one bus duct section with the bus bars of the other bus duct section.

7. A double plug-in bus duct as claimed in claim 6, wherein said joint structure is disposed substantially midway between opposite ends of said bus duct sections.

8. A double plug-in bus duct as claimed in claim 6, wherein the housing of each of said bus duct sections includes a corrugated outer sidewall portion and a corrugated inner sidewall portion adjacent the other bus duct section, and the bus bars of each of said bus duct sections are held in corrugations of the outer and inner sidewall portions of the respective housings.

References Cited

UNITED STATES PATENTS

| 3,088,994 | 5/1963 | Cataldo | 174—99 |
| 3,170,747 | 2/1965 | Herrmann et al. | 339—22 |
| 3,180,924 | 4/1965 | Rowe | 174—88 |

FOREIGN PATENTS

| 1,263,710 | 5/1961 | France. |

LARAMIE E. ASKIN, *Primary Examiner.*